United States Patent [19]
Farahmandi et al.

[11] Patent Number: 5,777,428
[45] Date of Patent: Jul. 7, 1998

[54] ALUMINUM-CARBON COMPOSITE ELECTRODE

[75] Inventors: C. Joseph Farahmandi; John M. Dispennette, both of Auburn, Ala.

[73] Assignee: Maxwell Energy Products, Inc., San Diego, Calif.

[21] Appl. No.: 686,579

[22] Filed: Jul. 26, 1996

Related U.S. Application Data

[62] Division of Ser. No. 319,493, Oct. 7, 1994, Pat. No. 5,621,607.

[51] Int. Cl.$^6$ .................... H01J 1/02; H01J 3/14; H01J 7/38; H01J 1/48
[52] U.S. Cl. .................... 313/352; 361/509; 361/516
[58] Field of Search .................... 313/352, 356, 313/353; 323/370; 361/328, 329, 330, 502, 522, 541, 517–520, 535–539, 433

[56] References Cited

U.S. PATENT DOCUMENTS

| | | | |
|---|---|---|---|
| 2,800,616 | 7/1957 | Becker et al. | 317/230 |
| 3,105,178 | 9/1963 | Meyers | 317/262 |
| 3,536,963 | 10/1970 | Boos | 317/230 |

(List continued on next page.)

FOREIGN PATENT DOCUMENTS

| | | |
|---|---|---|
| 0112923 | 6/1983 | European Pat. Off. |
| 0134706 | 8/1984 | European Pat. Off. |
| 0207167 | 12/1985 | European Pat. Off. |
| 0680061 | 3/1995 | European Pat. Off. |
| 5599714 | 7/1980 | Japan |
| 594114 | 1/1984 | Japan |
| 59105312 | 6/1984 | Japan |
| 63261817 | 10/1988 | Japan |
| 64001220 | 1/1989 | Japan |
| 64001222 | 1/1989 | Japan |
| 153524 | 3/1989 | Japan |

(List continued on next page.)

OTHER PUBLICATIONS

Fujii; "KYNOL Novoloid Fibers", *Informal Brochure*, (1990).

Technical Notes, "The Charcoal Cloth", (1987).

Cheng, et al.; "Preparation of Carbon Fibre Reinforced Aluminum Via Ultrasonic Liquid Infiltration Technique", *Materials Science and Technology*, 9, pp. 609–614 (Jul. 1993).

Foster, et al.; "New Highly Conductive Inorganic Electrolytes", *J. Electrochem. Soc.*, pp. 2682–2686, (Nov. 1988).

Farahmandi, et al.; "Optimization of Carbon Fibers Used in Electrochemical Capacitors for Electric Vehicle Applications", *The 36th Power Sources Conference, Cherry Hill, New Jersey*, pp. 23–26 (Jun. 6–9 1994).

Farahmandi, et al.; "Bipolar Electrochemical Capacitors Based on Organic Electrolytes for Electric Vehicle Applications", *The Fourth International Seminar on Double Layer Capacitors and Similar Energy Storage Devices, Boca Raton, Florida*, (Dec. 12–14, 1994).

Farahamndi, et al.; "A Comparison of Electrochemical Capacitors Using Organic and Aqueous Electrolytic Solutions for Electric Vehicle Applications", *Third International Seminar on Double Layer Capacitors and Similar Energy Storage Devices, Deerfield Beach, Florida*, (Dec. 6–8, 1993).

*Primary Examiner*—Sandra L. O'Shea
*Assistant Examiner*—Mark Haynes
*Attorney, Agent, or Firm*—Fitch, Even, Tabin & Flannery

[57] ABSTRACT

A high performance double layer capacitor having an electric double layer formed in the interface between activated carbon and an electrolyte is disclosed. The high performance double layer capacitor includes a pair of aluminum impregnated carbon composite electrodes having an evenly distributed and continuous path of aluminum impregnated within an activated carbon fiber preform saturated with a high performance electrolytic solution. The high performance double layer capacitor is capable of delivering at least 5 Wh/kg of useful energy at power ratings of at least 600 W/kg.

13 Claims, 1 Drawing Sheet

U.S. PATENT DOCUMENTS

| | | | |
|---|---|---|---|
| 3,648,126 | 3/1972 | Boos et al. | 317/230 |
| 3,652,902 | 3/1972 | Hart et al. | 317/230 |
| 3,700,975 | 10/1972 | Burtherus et al. | 317/230 |
| 4,313,084 | 1/1982 | Hosokawa et al. | 323/370 |
| 4,438,481 | 3/1984 | Phillips et al. | 361/433 |
| 4,562,511 | 12/1985 | Nishino et al. | 361/324 |
| 4,597,028 | 6/1986 | Yoshida et al. | 361/305 |
| 4,622,611 | 11/1986 | Bennett et al. | 361/433 |
| 4,709,303 | 11/1987 | Fujiwara et al. | 361/433 |
| 4,724,927 | 2/1988 | Morimoto et al. | 361/433 |
| 5,065,286 | 11/1991 | Kurabayashi et al. | 361/502 |
| 5,072,335 | 12/1991 | Kurabayashi et al. | 361/502 |
| 5,072,336 | 12/1991 | Kurabayashi et al. | 361/502 |
| 5,072,337 | 12/1991 | Kurabayashi et al. | 361/502 |
| 5,080,963 | 1/1992 | Tatarchuk et al. | 428/225 |
| 5,086,373 | 2/1992 | Kurabayashi et al. | 361/502 |
| 5,096,663 | 3/1992 | Tatarchuk | 419/11 |
| 5,099,398 | 3/1992 | Kirabayashi et al. | 361/502 |
| 5,102,745 | 4/1992 | Tatarchuk et al. | 428/605 |
| 5,121,301 | 6/1992 | Kurabayashi et al. | 361/502 |
| 5,136,472 | 8/1992 | Tsuchiya et al. | 361/502 |
| 5,142,451 | 8/1992 | Kurabayashi et al. | 361/502 |
| 5,150,283 | 9/1992 | Yoshida et al. | 361/502 |
| 5,304,330 | 4/1994 | Tatarchuk et al. | 264/61 |
| 5,450,279 | 9/1995 | Yoshida et al. | 361/502 |

FOREIGN PATENT DOCUMENTS

| | | |
|---|---|---|
| 1201908 | 8/1989 | Japan . |
| 1298712 | 12/1989 | Japan . |
| 266917 | 3/1990 | Japan . |
| 2177525 | 7/1990 | Japan . |
| 2248025 | 10/1990 | Japan . |
| 2297915 | 12/1990 | Japan . |
| 256805 | 12/1990 | Japan . |
| 3038815 | 2/1991 | Japan . |
| 3141629 | 6/1991 | Japan . |
| 465814 | 3/1992 | Japan . |
| 4206914 | 7/1992 | Japan . |
| 4206916 | 7/1992 | Japan . |
| 5299295 | 11/1993 | Japan . |
| 6275469 | 6/1994 | Japan . |

ALUMINUM-CARBON COMPOSITE ELECTRODE

This application is a divisional of U.S. application Ser. No. 08/319,493 which became U.S. Pat. No. 5,621,607, filed Oct. 7, 1994.

The invention described herein is subject to limited Government rights and licenses pursuant to the Government Waiver of Invention Rights under Department of Energy (DOE) SubContract EGG-C91-103647.

BACKGROUND OF THE INVENTION

The present invention relates generally to an electric double layer capacitor, and more particularly to a high performance double capacitor comprising aluminum carbon composite electrodes and a high performance electrolyte solution, and further includes a method for fabricating the same.

Double layer capacitors are energy storage devices that are able to store more energy per weight than traditional capacitors and they can typically deliver the energy at a higher power rating than many rechargeable batteries. Double layer capacitors consist of two porous electrodes that are isolated from electrical contact by a porous separator. Both the separator and the electrodes are impregnated with an electrolytic solution. This allows ionic current to flow between the electrodes while preventing electrical current from shorting the cell. On the back of each of these active electrodes is a current collecting plate. One purpose of the current collecting plate is to reduce ohmic losses in the double layer capacitor. If these current collecting plates are non-porous, they can also be used as part of the capacitor seal.

When electric potential is applied across the two electrodes in a double layer capacitor, ionic current flows due to the attraction of anions to the positive electrode and cations to the negative electrode. Upon reaching the electrode surface the charge is absorbed into the solid liquid interface region. This is accomplished by absorption of the charge species themselves or by realignment of the dipoles of the solvent molecule. The absorbed charge is held in the region by the opposite charges in the solid electrode.

The use of carbon electrodes in electrochemical capacitors represent a significant advantage in this technology because carbon has a low atomic weight and carbon electrodes can be fabricated with very high surface areas. Fabrication of double layer capacitors with carbon electrodes has been known in the art for quite some time, as evidenced by U.S. Pat. Nos. 2,800,616 (Becker), and 3,648,126 (Boos et al.).

A major problem in many carbon electrode capacitors is that the performance is often limited because of the high internal resistance of most carbon electrodes. This high internal resistance is due primarily to the high contact resistance of the carboncarbon contacts. This high resistance translates to large ohmic losses in the capacitor during the discharge phase. Lowering this internal resistance in double layer capacitors is achieved primarily through the reduction of electronic resistance in the electrode.

It is also difficult to simultaneously achieve a combination of large surface area and sufficient control of the carbon electrode porosity. Carbon electrode porosity translates to the degree of electrolyte accessibility to the surface carbon atoms.

In order to increase the operating voltage of many double layer capacitors, individual cells are often stacked in series. Current paths between cells must be minimized in order to reduce ohmic losses. The optimum design is to have adjacent cells separated with only a single current collecting plate. This plate must be non-porous so that no electrolytic solution is shared between cells. Separation prevents losses due to the shunt current path between cells. This type of design is called bipolar. In a bipolar double layer capacitor, one side acts as a positive electrode and the other side acts as a negative electrode for an adjacent cell. U.S. Pat. No. 3,536,963, issued to D.L. Boos, is an example of this bipolar double layer capacitor.

Another double layer capacitor design that has recently become popular is a spiral wound cell. U.S. Pat. No. 5,150,283, issued to Yoshida, et al., discloses one example of the spiral wound cell. In the Yoshida et al. patent an electric double layer capacitor has a pair of polarizable electrodes composed of electrically conductive substrates. The substrates are coated in layers of a mixture of activated carbon with a water soluble material based binding agent. The electrodes face each other interposed by a separator impregnated with an electrolyte. This capacitor has advantageous features of both conventional capacitors which use aqueous electrolytes and capacitors which typically use organic solvent electrolytes.

An advantage of the spiral wound cell of the double layer capacitor is that large surface area electrodes can be rolled into a small case. The large electrodes greatly reduce the internal resistance of the capacitor and the case greatly simplifies the capacitor seal or the sealing required for the double layer capacitor. In a bipolar design each cell must be sealed around the perimeter of the electrode. However, in a wound design, only the outer can requires sealing. This design is not as efficient as a bipolar design when the cells are stacked in series, because the resistance of the lead wires will add to the ohmic losses.

The present invention, however, is more concerned with electrochemical or double layer capacitors having aluminum/carbon composite electrodes. The metal/carbon composite electrodes, and more particularly, the aluminum/carbon composite electrodes, tend to minimize the internal resistance of the electrode. Teachings in the related art that are of particular importance involve methods of fabricating the aluminum/carbon composite electrodes, methods of fabricating and adhering the current collector to the composite electrode, and suitable electrolytes that can be used with high performance double layer capacitors.

Various fabrication techniques for reducing the internal resistance of carbon composite electrodes have been disclosed over the recent years. For example, the Yoshida et al. patent (U.S. Pat. No. 5,150,283) discloses a method of fabricating a aluminum/carbon composite electrode by depositing carbon powder and other electrical conductivity-improving agents on an aluminum substrate.

Another related approach is disclosed in U.S. Pat. No. 4,597,028 (Yoshida et al.) which teaches that the incorporation of metals such as aluminum into carbon fiber electrodes can be accomplished through weaving metallic fibers into carbon fiber preforms.

U.S. Pat. No. 4,562,511, (Nishino et al.) describes yet another approach where the carbon fiber is dipped into an aqueous solution such that a layer of a conductive metal oxide, and preferably a transition metal oxide, is formed in the pores of the carbon fibers. Nishino et al. also discloses the formation of metal oxides, such as tin oxide or indium oxide by vapor deposition.

Still another related method is disclosed in U.S. Pat. Nos. 5,102,745, 5,304,330, and 5,080,963 (Tatarchuk et al.).

These disclosures demonstrate that metal fibers can be interwoven with the carbon preform and sintered to create a structurally stable conductive matrix which may be used as a composite electrode. The Tatarchuk et al. patents also teach a process that reduces the electrical resistance in the composite electrode by reducing the number of carbon—carbon contacts, which current must flow through to reach the metal conductor. This approach works well if stainless steel or nickel fibers are used as the metal. However, this approach has not been successful when aluminum fibers are used because of the formation of aluminum carbide during the sintering or heating of the composite electrode.

The use of aluminum in fabrication processes of double layer capacitors is important because aluminum is the optimum metal in terms of cost, availability and performance. For example, with an aluminum/carbon composite electrode, in a double layer capacitor with a nonaqueous electrolyte, it is quite possible to achieve an operating voltage of 3.0 volts. However, with nickel or stainless steel in lieu of aluminum, the operating voltage must be reduced to less than 2.0 volts.

Related designs of double layer capacitors are also discussed in U.S. Pat. No. 4,438,481, issued to Phillips, et al.; U.S. Pat. No. 4,597,028 issued to Yoshida, et al.; U.S. Pat. No. 4,709,303 issued to Fujiwara, et al.; U.S. Pat. No. 4,725,927, issued to Morimoto; and U.S. Pat. No. 5,136,472, issued to Tsuchiya, et al.

Another area of great concern in the fabrication of double layer capacitors is concerned with the method of fabricating the current collector plate and adhering the current collector plate to the electrode. This is important because the interface between the electrode and the current collector plate is another source of internal resistance of the double layer capacitor.

The Nishino et al. patent (U.S. Pat. No. 4,562,511) suggests plasma spraying of molten metals such as aluminum onto one side of the polarizable electrode thereby forming an appropriate layer which acts as the current collector. This patent further considers alternative techniques for bonding and/or forming the current collector including arc-spraying, vacuum deposition, sputtering, non-electrolytic plating, and use of conductive paints.

The Tatarchuk et al. patents (U.S. Pat. Nos. 5,102,745, 5,304,330, and 5,080,963) show the bonding of a metal foil current collector to the electrode by sinter bonding the metal foil to the electrode element.

U.S. Pat. No. 5,142,451 (Kurabayashi et al.) discloses a method of bonding of the current collector to the electrode by a hot curing process such that the material of the current collectors enter the pores of the electrode elements.

U.S. Pat. No. 5,099,398 (Kurabayashi et al.) discloses a method of bonding of the current collector to the electrode by chemically bonding a thin film collector such that some of the material of the current collectors enter the pores of the electrode elements. This patent further discloses some other conventional methods of bonding the current collector to the electrode including the use of electrically conducting adhesives and bonding under pressure and heat.

Still other related art concerned with the method of fabricating and adhering current collector plates can be found in U.S. Pat. Nos. 5,065,286; 5,072,335; 5,072,336; 5,072,337; and 5,121,301 all issued to Kurabayashi et al.

Accordingly, there is a continuing need for improved double layer capacitors with carbon/aluminum composite electrodes. These improved double layer capacitors need to deliver large amounts of useful energy at a very high power output and power density ratings. These improved double layer capacitors should also have a relatively low internal resistance and yet be capable of yielding a relatively high operating voltage.

Furthermore, it is also apparent that improvements are needed in the techniques and methods of fabricating double layer capacitors with aluminum/carbon composite electrodes in an effort to lower the internal resistance of the double layer capacitor and maximize the operating voltage. Since capacitor energy density increases with the square of the operating voltage, higher operating voltages translate into higher performing capacitors because of the significantly higher energy densities and power output ratings.

SUMMARY OF THE INVENTION

The present invention is a high performance double layer capacitor having an electric double layer formed in the interface between activated carbon and an electrolyte. The high performance double layer capacitor includes a pair of aluminum impregnated carbon composite electrodes having an evenly distributed and continuous path of aluminum impregnated within an activated carbon fiber preform and saturated with a high performance electrolyte solution. The high performance double layer capacitor is capable of delivering at least 5 Wh/kg of useful energy at power ratings of at least 600 W/kg. The present invention further identifies methods of making the high performance double layer capacitor.

Accordingly, it is an object of the present invention to provide an improved double layer capacitor having a relatively high energy density of greater than 5 Wh/kg.

It is another object of the present invention to provide an improved double layer capacitor having a maximum useable power density of greater than 500 W/kg.

It is a further object of the present invention to provide an improved double layer capacitor having a relatively low internal resistance.

An important feature of the invention is the high surface area and highly porous aluminum/carbon composite electrode which when used in a 3.0 Volt cell has a resistivity of less than 1.5 $\Omega cm^2$ and an electrode capacitance of at least 30 $F/cm^3$.

Another important feature of the invention is the identified use of advanced electrolytic solutions that allow higher operating voltages.

The present invention further includes an improved method of making the high performance double layer capacitors by impregnating molten aluminum into carbon fiber preforms. The present invention also identifies various improvements in the fabrication of aluminum/carbon composite electrodes and techniques for bonding the current collector plate to the electrode.

One improved feature is the use of selected wetting agents to improve the process of the impregnating molten aluminum into carbon fiber preforms.

Another improved feature is the application of ultrasonic vibrations and the cycling of external pressure during the impregnation process as a means for improving the wettability of molten aluminum into the carbon fiber preforms.

Yet another feature of the present invention is an improved means for bonding the composite electrode to an aluminum foil current collector involving a diffusion bonding technique performed in an inert atmosphere and a bonding temperature well below the melting point of aluminum.

These and other objects, features and advantages of the present invention will be more apparent from a thorough consideration of the drawings and detailed description that follow.

BRIEF DESCRIPTION OF THE DRAWINGS

In the following detailed description, reference will be made to the attached drawings in which.

DETAILED DESCRIPTION OF THE INVENTION

The high performance double layer capacitor disclosed herein is preferably a large bipolar type double layer capacitor that can deliver large amount of useful energy at a very high power output and power density ratings. Specifically, the high performance double layer capacitor is capable of delivering at least 5 Wh/kg of useful energy at power ratings of at least 600 W/kg. Further, the preferred high performance double layer capacitor demonstrates a relatively low internal resistance, yielding a charge/discharge efficiency rating of at least 90 percent and also demonstrates relatively high operating voltages of approximately 3.0 Volts for a single cell capacitor. When configured as a series stack of bipolar type double layer capacitors, the high performance capacitor stack operates, for example, as much as 350 Volts and will store about 1.8 MJ of energy.

The high performance double layer capacitor preferably includes advanced aluminum/carbon composite electrodes with a high performance electrolytic solution. Of particular importance is the advantageous method of fabricating the aluminum/carbon composite electrodes and the method of adhering the current collector that are employed with the present high performance double layer capacitors.

Figure 1:
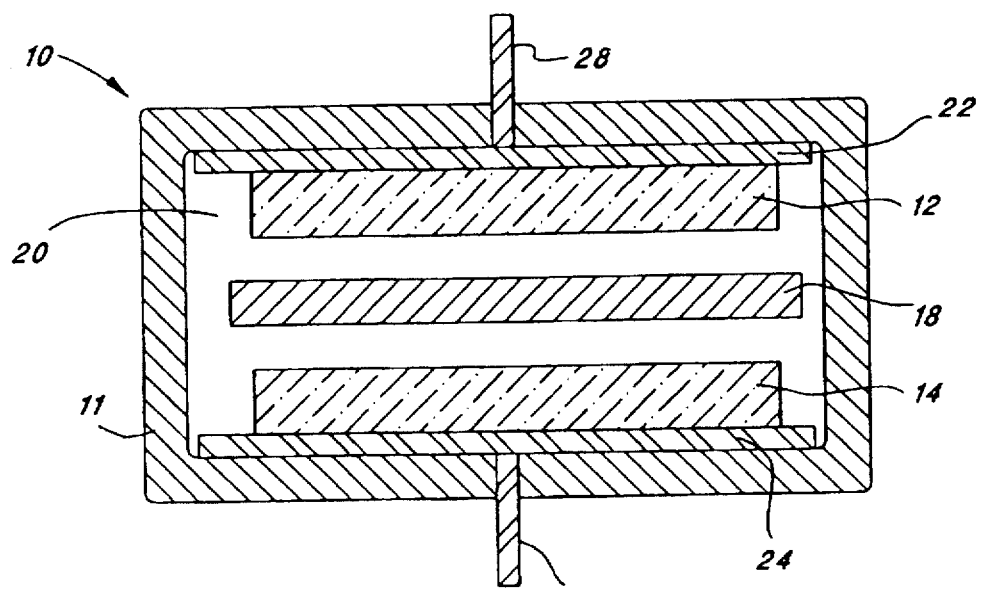
FIG. 1 is a sectional view of a single cell high performance double layer capacitor in accordance with the present invention.

Referring to FIG.1, a single cell high performance double layer capacitor 10 is illustrated including a cell holder 11, a pair of aluminum/carbon composite electrodes 12 and 14, an electronic separator 18, an electrolyte 20, a pair of current collector plates 22 and 24, and electrical leads 28 and 29, extending from the current collector plates 22 and 24.

The pair of aluminum/carbon composite electrodes 12 and 14 are preferably formed from a porous carbon cloth preform or carbon paper preform which is impregnated with molten aluminum. The porosity of the aluminum/carbon composite electrodes 12 and 14 must be closely controlled during the impregnation process to subsequently permit a sufficient amount of the electrolyte 20 to be introduced into the double layer capacitor 10 and penetrate the pores of the carbon fibers.

The pair of current collector plates 22 and 24 are attached to the back of each aluminum/carbon composite electrode 12 and 14. Preferably, the current collector plates 22 and 24 are thin layers of aluminum foil. In this single cell capacitor configuration, the current collecting plates 22 and 24 are preferably non-porous, such that they can also be used as part of the external capacitor seal.

An electronic separator 18 is placed between the opposing aluminum/carbon composite electrodes 12 and 14. The electronic separator 18 is preferably made from a highly porous material which acts as an electronic insulator between the aluminum/carbon composite electrodes 12 and 14. The purpose of the electronic separator 18 is to assure that the opposing electrodes 12 and 14 are never in contact with one another. Contact between electrodes results in a short circuit and rapid depletion of the charges stored in the electrodes. The porous nature of the electronic separator 18 allows movement of the ions in the electrolyte 20. The preferred electronic separator 18 is a porous polypropylene disk approximately 1 mil thick. The polypropylene separator is initially soaked in the electrolyte 20 prior to inserting it between the aluminum/carbon composite electrodes 12 and 14.

The cell holder 11 can be any known packaging means commonly used with double layer capacitors. In order to maximize the energy density of the double layer capacitors, it is an advantage to minimize the weight of the packaging means. Packaged double layer capacitors are typically expected to weigh not more than 25 percent of the unpackaged double layer capacitor. The electrical leads 28 and 29 extend from the current collector plates 22 and 24 through the cell holder 11 and are adapted for connection with an electrical circuit (not shown).

Figure 2:
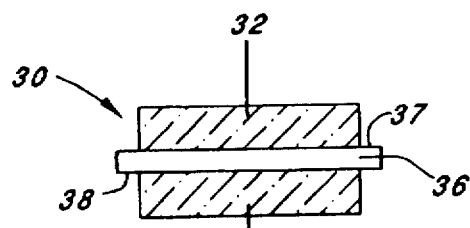
FIG. 2 is a sectional representation of a bipolar aluminum/carbon composite electrode in accordance with the present invention.
Figure 3:
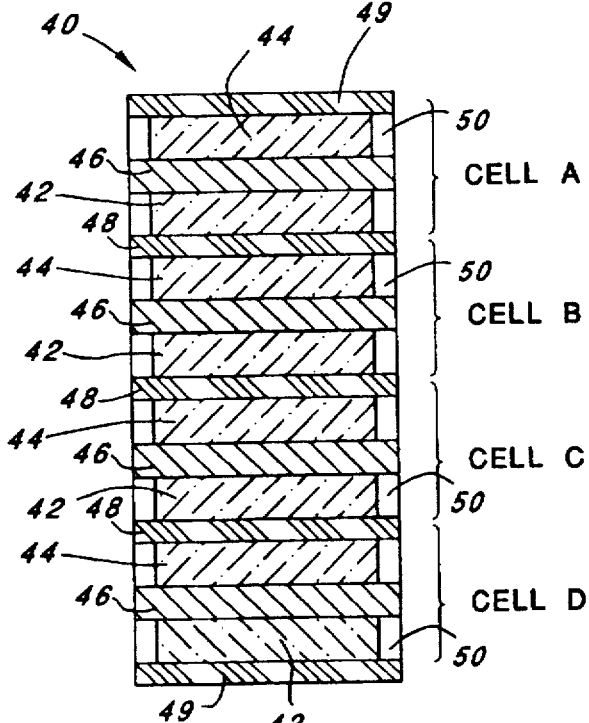
FIG. 3 is a sectional representation of a series stack of the high performance bipolar type double layer capacitors.

As seen in FIG. 2 and FIG. 3, a bipolar aluminum/carbon composite electrode 30 and a corresponding series stack of the high performance bipolar double layer capacitors 40 are illustrated. The bipolar aluminum/carbon composite electrode 30 comprises a polarized aluminum/carbon composite body separated with a non-porous current collector plate 36. Attached to one surface 37 of the current collector plate 36 is a charged electrode 32 for a first cell. Attached to the opposite surface 38 of the current collector plate 36, is an oppositely charged electrode 34 for a second cell. In other words, if the first electrode 32 is a negative electrode for a first capacitor cell "A", the second electrode 34 is then a positive electrode for an adjacent cell "B".

As seen more clearly in FIG. 3, a series stack of the high performance bipolar double layer capacitors 40 includes a plurality of cells (A, B, C,and D) which are preferably connected in series. Each cell includes a pair of aluminum impregnated carbon composite porous electrodes 42 and 44 facing one another with an ionically conductive separator 46 disposed between them. A plurality of non-porous current collectors 48 are placed between each cell, with each current collector 48 having two adjoining polarized electrodes 42 and 44 of different cells bonded thereto, as described herein. Further, a sufficient amount of an electrolyte 50 is introduced within each cell such that the electrolyte 50 saturates the composite electrodes 42 and 44 and separator 46 within each cell. Exterior current collecting plates 49 are placed at each end of this stack.

The individual aluminum/carbon composite electrodes 42 and 44 are preferably formed in a manner similar to the process described above. Each electrode is fabricated from a carbon cloth preform or carbon paper preform which is impregnated with molten aluminum. As above, the porosity of the aluminum/carbon composite electrodes 42 and 44 must be closely controlled during the impregnation process to subsequently permit a sufficient amount of the electrolyte 50 to be introduced into the capacitor cell and penetrate the pores of the carbon fibers.

The aluminum impregnated carbon composite electrodes 42 and 44 are sufficiently porous and preferably have an evenly distributed and continuous path of aluminum impregnant within activated carbon fibers such that the equivalent series resistance of each composite electrode when used in a 3 Volt cell is about 1.5 Ωcm² and the capacitance of each composite electrode 42 and 44 is approximately 30 F/cm³ or greater.

The internal current collector plates 48 of each bipolar electrode are preferably non-porous layers of aluminum foil designed to separate the electrolyte 50 between adjacent cells. The exterior current collecting plates 49 are also non-porous such that they can be used as part of the external capacitor seal, if necessary.

An electronic separator 46 is placed between the opposing aluminum/carbon composite electrodes 42 and 44 within a particular capacitor cell. The electronic separator 46 is preferably a porous polypropylene disk similar to the electronic separators used in the single cell configuration.

Many of the attendant advantages of the present double layer capacitor result from the preferred methods of fabricating the aluminum/carbon composite electrodes, the preferred method of adhering the current collector, and the use of high performance electrolytes. Each of these aspects of the invention are discussed in further detail in the paragraphs that follow.

ALUMINUM/CARBON COMPOSITE ELECTRODE

As identified above, the aluminum/carbon composite electrode is preferably made from a porous carbon fiber cloth preform or carbon fiber paper preform which is impregnated with molten aluminum. The preform can be fabricated from any suitable activated carbon fiber material such as carbon fiber felt or other activated carbon fiber substrates having a sufficient porosity to receive the impregnated molten aluminum and electrolytic solution.

The impregnated aluminum is evenly distributed and continuous throughout the preform such that it provides a low resistance current path within the electrode. The aluminum/carbon composite electrode also remains sufficiently porous so that an electrolytic solution, preferably a nonaqueous electrolytic solution, infiltrates the pores of the activated carbon fibers.

The fabrication process of the aluminum/carbon composite electrodes of the double layer capacitor starts with the fabrication of a carbon fiber electrode preform. The carbon fiber electrode preform is typically manufactured paper or cloth preform using high surface area carbon fibers. The surface area of these carbon fibers can range from approximately 500 to 3000 m²/g. The carbon fiber paper preform is constructed with standard paper making equipment using approximately 8–10 μm diameter carbon fibers that are cut to a length of approximately 2 to 7 mm. Cellulose fibers of comparable size can also be added to the preform to act as a binding agent and in order to control the porosity of the resulting preform.

The carbon fiber cloth preform is preferably a commercially available cloth which uses woven carbon fibers also having a surface area of approximately 500 to 3000 m²/g and a diameter of approximately 8–10 μm. The carbon fiber cloth preform is typically more expensive than the carbon fiber paper preform but the carbon fiber cloth preform has more structural stability than the carbon fiber paper preform. The surface area and other dimensions of the carbon fibers, however, can be easily tailored to meet the requirements of the application in which it is used.

Impregnation of the carbon fiber preforms with molten aluminum is preferably accomplished using a plasma spraying technique, or alternatively by using a liquid infiltration or dipping technique. In the plasma spraying technique, the molten aluminum is preferably sprayed onto both sides of the carbon fiber preform. Plasma spraying molten metal has previously been used in double layer capacitor construction, but has typically been used only as a means for forming the current collector.

The plasma spray technique is optimized to penetrate into the carbon fiber cloth preform and form a porous and evenly distributed aluminum matrix. This optimization is accomplished by adjusting the electrical current to the spray unit, the temperature and pressure of the molten aluminum, the distance of the plasma spray unit from the carbon fiber preform, and the sweep of the plasma spray unit.

In the liquid infiltration technique, the molten aluminum is impregnated into the structure by dipping or immersing the carbon fiber preform into a molten bath of aluminum. Molten aluminum, however, does not wet the surface of carbon fiber easily, therefore it does not enter into the pores of the carbon fiber. Because of the poor wetting properties of carbon, special techniques are needed to properly impregnate the molten aluminum into the interstices of the carbon fibers.

These electrode impregnation enhancing techniques involve variations of impregnation techniques that are used to create aluminum graphite composites in the aerospace industry. These impregnation techniques are uniquely adapted and modified for the present method of fabricating of aluminum/carbon composite electrodes. For example, it is necessary to accurately control the impregnation process so that the composite electrode remains adequately porous for the electrolytic solution to carry ionic current.

One such technique of improving impregnation uses an ultrasonic vibration to improve the wettability of carbon fibers by molten aluminum. As the carbon fiber preforms are being immersed in the molten bath to be impregnated with the molten aluminum, ultrasonic vibrations are directed to the site of impregnation. When these vibrations oscillate the pressure in the liquid cause localized cavitations. At some particular frequencies, the molten aluminum is pumped into the interstices of the carbon fibers. By varying the frequency of the ultrasonic vibrations, the level of impregnation can be controlled, thereby assuring the porous resulting product.

Another technique for improving the impregnation of the molten aluminum into the carbon preform during the fabrication of the aluminum/carbon composite electrode involves other means for cycling the external pressure on the molten aluminum being impregnated. The rise and fall of the pressure creates a pumping action that will help molten aluminum enter into the spaces between the carbon fibers. The temperature of the molten aluminum is often increased to further aid the aluminum in filling spaces between the carbon fibers.

Wetting agents are also used as a means of further aiding the impregnation of molten aluminum into the carbon preform during the fabrication of the aluminum/carbon composite electrode. The wettability of a carbon fiber is enhanced by initially immersing the carbon fiber into a molten metal infiltrate composed of wetting agents such as Tin-Titanium or a Copper-Tin-Titanium alloy of molten sodium. When the carbon preform is removed from the metal infiltrate, it is immersed in a bath of molten aluminum. The molten aluminum leaches out the wetting agent from the carbon fibers which allows the aluminum to fill the interstices of the carbon fibers. Other suitable wetting agents such as Tantalum, Titanium-Carbon, Titanium-Nitrogen, Titanium-Nitrogen-Carbon, or Silicon-Carbon may also be introduced in the carbon fiber preforms to aid with the impregnation of the molten aluminum.

Alternative techniques for improving the wettability of carbon fibers are also contemplated for use in the fabrication process of aluminum/carbon composite electrodes for double layer capacitors. Such alternative means of improving wettability include, for example, coating the carbon fibers with a thin layer of metals such as silver, cobalt, copper, or nickel. However, it is important to note that any foreign agents or other contaminants used in the fabrication of composite electrodes for double layer capacitors must either be substantially removed prior to capacitor use or the presence of such agents should not severely limit the physical characteristics or performance of the double layer capacitor.

The ultrasonic vibrations, as described above, or external pressure cycling can also be used with or without a wetting agent as a means of improving the impregnation process of the molten aluminum. In addition, the variations of the plasma spraying process, as described above, may also be used with or without a wetting agent as a means of improving the impregnation process of the molten aluminum.

The control of the impregnation process allows for the control of the electrode porosity. The porosity of the aluminum/carbon composite electrode is closely controlled during the impregnation process to subsequently permit the electrolytic solution to enter the pores of the carbon fibers unimpeded and thus forming a sufficiently large interface region between the electrolyte and the carbon fibers.

Introducing aluminum into the electrode as described above, alters the electrolytic path for the ionic current in the electrode/electrolyte interface region. This altered electrolytic path, however, does not add significantly to the internal resistance of the double layer capacitor because most of the internal resistance remains in the small pores of the carbon fibers.

The porosity of the aluminum/carbon composite electrode can best be expressed as a weight ratio of the aluminum to the activated carbon. It is important however, that the aluminum be evenly distributed and continuous throughout the preform such that it provides a low resistance current path within the composite electrode. The preferred weight ratio of the aluminum to carbon is in the range of between about 1.3 to 0.5, and more preferably less than 1.0.

As identified earlier, the control of impregnation process and the resulting control of the electrode porosity can be accomplished in several manners including the use of wetting agents, cycling of the external pressure of the molten aluminum, and/or introducing ultrasonic vibrations during liquid infiltration. By adjusting the frequency and magnitude of ultrasonic vibrations and pressure variations during liquid infiltration, the impregnation of molten aluminum can be varied.

Further, the control of external parameters in the plasma spraying process will affect the resulting porosity of the electrode. For example, adjusting such external parameters as the electric current directed to the plasma spray unit, the sweep rate of the plasma spray unit, the standoff distance between the plasma spray unit and the carbon fiber preform; and the delivery temperature and pressure of the molten aluminum, one can achieve the optimum porosity.

Alternatively or conjunctively, by varying the amount of cellulose used in carbon fiber paper preforms, the porosity of the aluminum/carbon composite electrodes can be controlled. Specifically, porosity control is accomplished by carbonizing or sintering the cellulose fibers thereby causing their removal after the molten aluminum is impregnated into the carbon fiber preform.

EXAMPLE 1

The following description is representative of the preparation and fabrication of the aluminum/carbon composite electrodes and high performance double layer capacitor. This example, together with the previous detailed description, represents a best mode presently contemplated for carrying out the invention. This description is not to be taken in a limiting sense, but is made merely for the purpose of describing some of the general principles of the invention. The scope of the invention should be determined with reference to the claims.

Carbon fiber preforms were made using activated carbon fibers of approximately 5 mm in length and approximately 8 µm in diameter. The activated carbon fibers had a surface area of approximately 2500 $m^2/g$. Cellulose fibers of approximately 5 mm in length and approximately 8 µm in diameter were also incorporated within the carbon fiber preforms. The cellulose fibers were added as a binding agent and to control the porosity of the electrode. The percentage of cellulose fibers added comprised from between about 9.0 to 50 percent of the weight of the preform and more preferably about 15 percent by weight.

Alternatively, the carbon fiber preforms could be obtained from a commercial source. These carbon fiber preforms are typically activated carbon fabrics wherein the individual carbon fibers are wrapped in bundles called a tow. The preferred fabric employed a tow consisting of carbon fibers that were approximately 8 µm in diameter and had a surface area of about 2500 $m^2/g$. The tow was woven to create a fabric that was approximately 17 mils thick.

The carbon fiber preforms were impregnated with molten aluminum using a plasma spraying technique. The spraying process was optimized to penetrate evenly into the carbon fiber preforms through adjustment of the current to the spray unit, the pressure of the spray, the standoff distance of the spray from the preform, the vertical step distance, and the sweep rate of the spray. The optimum conditions for this example was determined to be 65 amps of current to the spray unit, a spray pressure of 50 psi with a standoff distance of about 20 inches. The sweep rate of the plasma spray unit was about 63.6 inches per second and the vertical step distance was approximately 1 inch. Each aluminum/carbon composite electrode contained approximately 0.2 grams of carbon fibers to approximately 0.24 grams of aluminum.

After the spray process was completed, composite electrode disks were punched from the impregnated carbon preform. Each composite electrode had a diameter of about 5.1 cm (2 inches) and a thickness of about 17 mils. This translates into a surface area of about 20.3 $cm^2$.

The cellulose fibers were removed from the composite electrode by sintering the electrode at approximately 200° C.–300° C. in a reducing atmosphere.

An aluminum foil sheet of 2.0 mils thick was bonded to each aluminum/carbon composite electrode at a temperature of between about 360° C.–600° C., and an external pressure of 12 psi, in the presence of an inert or slightly reducing atmosphere. The finished aluminum/carbon composite electrodes with current collector plate was a disk shaped device with a surface area of about 20.3 $cm^2$ and a thickness of about 0.048 cm.

The assembly of the single cell capacitor further includes a porous polypropylene separator of about 1 mil thick which was placed between the aluminum/carbon composite electrodes to act as the electronic separator. An electrolytic solution of 1.4M tetraethylammonium tetrafluoroborate in acetonitrile was then impregnated into the carbon/aluminum composite electrodes and separator using a vacuum infiltration technique. The capacitor was then externally sealed.

Table 1 identifies several examples of the activated carbon/aluminum composite electrode and their performance characteristics. It is important to note that ID No. 071994A utilizes a different carbon cloth than the above-described cloth preforms and similarly has a greater thickness than the other samples. Measurements of the resistance and capacitance were made for the purposes of comparison only.

TABLE 1

Aluminum/Carbon Composite Electrode Performance Characteristics

| ID | Preform Material | Surface Area | Size | Capacitance | Energy Density | Series Resistance ($\Omega$ *cm$^2$) |
|---|---|---|---|---|---|---|
| 092094A | carbon cloth/ aluminum | 2500 m$^2$/g | 20 cm$^2$ | 15.0 F | 7.8 Wh/kg | 0.85 |
| 071994A | carbon cloth/ aluminum | 1150 m$^2$g | 20 cm$^2$ | 24.8 F | 7.85 Wh/kg | 0.85 |
| 081694A | carbon cloth/ aluminum | 2500 m$^2$/g | 11.4 cm$^2$ | 7 F | 6.9 Wh/kg | 0.69 |
| 040694A | carbon paper/ aluminum | 2500 m$^2$/g | 20 cm$^2$ | 7.5 F | 3.6 Wh/kg | 2.4 |
| 051094A | carbon cloth/no aluminum | 2500 m$^2$/g | 20 cm$^2$ | 11.23 F | 8.02 Wh/kg | 52 |

ADHERING CURRENT COLLECTOR TO COMPOSITE ELECTRODE

After the aluminum is impregnated into the carbon fiber preform, an aluminum foil is secured to the backside of the electrode. In such a process, the aluminum impregnated carbon preform diffusion bonds to the aluminum foil thereby creating a low resistance bond between the composite electrode and the current collector. The aluminum foil functions as the current collector or conductive electrode of the capacitor. Specifically, the diffusion bonding is accomplished by first modifying or removing the oxide layer on the aluminum foil and then heating the electrode and foil structure under pressure in an inert atmosphere. This bonding process involves the combination of high temperature, and moderate pressure in an inert atmosphere to bring the surfaces of the composite electrode and the current collector together. These steps are performed so the aluminum atoms fill the voids at the interface to adhere the current collector to the composite electrode.

In a bipolar capacitor stack, the bonded foil must be non-porous in order to separate the electrolytic solutions between cells. The foil must be thick enough to ensure there are no pinholes or other defects. A foil thickness between about 0.5 mils and 3.0 mils is preferred for bipolar electrodes.

Aluminum is not a material that is well suited for diffusion bonding. The difficulty arises from the strong oxide layer that is typically present on an aluminum surface. This oxide layer tends to retard the transfer of aluminum between the surfaces to be bonded. Most diffusion bonding techniques involving aluminum require a high external pressure and a bonding temperature that is just below the melting point of aluminum. The pieces or structures to be bonded typically must be held at this state in an inert atmosphere for an extended period of time. These bonding conditions are not acceptable for activated carbon/aluminum composite electrodes because a high external pressure pulverizes the activated carbon fibers in the electrode. Further, the high temperature for an extended period of time results in the formation of aluminum carbide. The formation of aluminum carbide significantly reduces the performance of the electrode.

The present process bonds the aluminum/carbon composite electrodes to an aluminum foil with low external pressure, at a lower temperature, and for a relatively shorter amount of time. The present method further significantly reduces the amount of aluminum carbide formed during the bonding process, and allows the bond to form without physically damaging the activated carbon fibers in the electrode. The present preferred bonding process allows for the bonding of the aluminum foil to the aluminum/carbon composite electrode at a temperature range of between about 300° C. and 600° C., and more preferably at about 360° C.±50° C. The bond is achieved with an external pressure of about 12 psi.

This improved bonding technique, performed under advantageous conditions, is achieved by physically removing or modifying the oxide layer on the aluminum foil prior to bonding the foil to the electrode in an inert atmosphere. The oxide layer is removed using an argon ion sputtering technique. Alternatively, the oxide layer can be modified by etching the aluminum foil in a solution of sodium dichromate in sulfuric acid, e.g. [Na$_2$(Cr$_2$O$_2$) in H$_2$SO$_4$]. In either technique the aluminum oxide layer is significantly reduced.

Before the aluminum foil is bonded to the aluminum/carbon composite electrode, any cellulose fibers present in the aluminum/carbon composite electrode can be removed by carbonizing or sintering the cellulose fibers by heating them in inert atmosphere or alternately by reducing them chemically. By varying the amount of cellulose used in preforms, the resulting porosity of the aluminum/carbon composite electrodes can be controlled.

For the bipolar aluminum/carbon composite electrode, as each pair of aluminum impregnated carbon fiber preforms are removed from the impregnation process, they are aligned together and bonded to a single layer of aluminum foil. The preferred process involves simultaneously diffusion bonding the aligned pair of aluminum/carbon composite electrodes to an aluminum foil current collector under low pressure, a relatively low temperature and in an inert atmosphere. As before, the process avoids the formation of aluminum carbide and other contaminants and prevents physical damage to the carbon fibers. The quality of the bond is enhanced by first etching both surfaces of the aluminum foil or by removing any aluminum oxide layers that may be present.

EXAMPLE 2

The following description is representative of the diffusion bonding process and preparation therefor. This example, together with the previous detailed description, represents a best mode presently contemplated for carrying out the invention. This description, however, is not to be taken in a limiting sense, but is made merely for the purpose of describing some of the general principles of the invention. The scope of the invention should be determined with reference to the claims.

An etchant bath was prepared for etching the aluminum foil by combining approximately 60 g of Na$_2$(Cr$_2$O$_2$)·2H$_2$O with about 173 ml of concentrated $H_2SO_4$, about 1.9 grams of aluminum powder, and enough water to make a one liter solution. The etchant bath was heated to approximately 60° C. In addition, a water bath for rinsing the etched aluminum foil was prepared and also heated to approximately 60° C.

The aluminum foil was immersed in the etchant bath for about 15 minutes. The foil was then removed from the etchant bath and immersed in the water bath to rinse the foil. The foil was then dried in an oven for approximately 30 minutes.

The electrodes and etched foil were then assembled for diffusion bonding. A carbon cloth preform was used as a release sheet and Hastoloy X plates were used to apply moderate pressure of between about 3 psi to 400 psi and preferably about 12 psi to electrode/foil assembly. The electrode/foil assembly was placed in a stainless steel reactor for the actual diffusion bonding.

The present diffusion bonding process involves heating the electrode and foil assembly within the stainless steel reactor while under moderate pressure in an inert atmosphere. After the aluminum is impregnated into the carbon fiber preform, thus forming composite electrodes, the electrodes were dried for approximately 30 minutes. The electrodes were then purged with hydrogen (550 ml/min) and argon (1000 ml/min) at approximately 100° C. Next, the cellulose fibers were carbonized at 300° C. for about 30 minutes while still purging the electrodes with hydrogen (550 ml/min) and argon (1000 ml/min). The hydrogen was then turned off and the argon rate was increased to approximately 1500 ml/min.

The bonding temperature was then attained by ramping the reactor temperature, as required, from 300° C. to the final bonding or sintering temperature which is between about 300° C.–600° C. (See Table 2). This bonding temperature was maintained for a prescribed bonding time of about one to five hours as indicated in Table 2. The reactor was then turned off and the electrodes were allowed to cool for about 90 minutes. After, the 90 minutes time, the reactor was further cooled with water and the electrodes were removed.

Table 2 identifies the capacitance, series resistance and other performance characteristics of several electrode/foil assemblies that were diffusion bonded in accordance with the above-described bonding process. Measurements of the resistance and capacitance were made for the purposes of comparison only.

resistance than the non-aqueous electrolytic solutions. On the other hand, the nonaqueous electrolytic solutions often have higher ionic conductivities and thus increase the operating voltage of the double layer capacitors. In particular, these non-aqueous electrolytic solutions have allowed the operating voltage of single cell double layer capacitors to be increased to approximately three volts.

The present invention considers the use of some advanced electrolytic solutions. These advanced electrolytic solutions often fall into three types or classes of solutions. First, there are ammoniate solutions which use gaseous ammonia as the solvent for the electrolyte. The preferred ammoniate solutions result when certain salts are combined with gaseous ammonia to form highly conductive liquids at room temperature. Because of their high conductivity, voltage stability, and temperature range, these solutions are good candidates for electrolytes in high performance double layer capacitors. Examples of some ammoniate solutions which are suitable for use as electrolytes in high performance double layer capacitors include:

$[NH_4NO_3] \cdot 1.3[NH_3]$;

$[NaI] \cdot 3.3[NH_3]$; and $[LiClO_4] \cdot 4[NH_3]$.

The second class of electrolytes is comprised from sulfur dioxide based solutions. The sulfur dioxide, which is a gas at room temperature, is used as the solvent for the electrolyte. The sulfur dioxide dissolves some salts so as to form liquid electrolytes at room temperature. These sulfur dioxide based solutions typically have higher conductivity than corresponding ammoniate solutions but they also tend to be more corrosive. An example of these electrolytes is obtained when sulfur dioxide is used to dissolve tetrachloroaluminates of Lithium, Cadmium, Sodium or Strontium. These electrolytic solutions can be generally characterized as follows:

$M[AlCl_4] \cdot x\ SO_2$ where x is between 2.5 and 6.0; and
where M is selected from Li, Ca, Na, or Sr.

The third class of improved electrolyte which are suitable for use in high performance double layer capacitors are the molten salt electrolytes. The molten salt electrolytes are

TABLE 2

| | Electrode/Foil Bonding Characteristics | | | | | | |
|---|---|---|---|---|---|---|---|
| ID | Bonding Temp (°C.) | Bonding Pressure (psi) | Bonding Time (hours) | Electrode Area | Capacitance | Energy Density (Wh/kg) | Series Resistance (Ω·cm²) |
| 092094A | 360 | 12 | 4.5 | 20.2 cm² | 15 F | 7.8 | 0.85 |
| 090194A | 500 | 12 | 2 | 20.2 cm² | 14.8 F | 8.2 | 0.95 |
| 092094A | 600 | 12 | 1 | 19.0 cm² | 14.5 F | 7.0 | 0.82 |

HIGH PERFORMANCE ELECTROLYTES

The performance of double layer capacitors is very much dependent on the choice of electrolytic solutions used. Traditional aqueous electrolytes typically exhibit lower formed from ionic salts that have been liquified at elevated temperatures. The elevated temperatures typically are in the range of 450° C. and above. These high temperature molten salt electrolytes possess the highest ionic conductivity and breakdown voltage of any electrolytic solutions. The major drawback to these solutions are that they require high operating temperatures and in many are highly corrosive liquids.

An example of a high temperature molten salt electrolyte that is suitable for use in high performance double layer capacitors is a mixture of potassium chloride and/or lithium chloride. A high performance double layer capacitor using such electrolytes, should have an operating voltage of above 4 volts and an ionic conductivity of approximately 1.6 S/cm at about 450° C.

Moreover, there are some alkali metal tetrachloroaluminates and tetrabromoaluminates which are molten salt electrolytes that have operating temperatures between about 100° C.–400° C. with conductivities ranging from 0.15 to 0.45 S/cm. There also exist several chloroaluminate molten salts, which are liquids at room temperature, which are deemed to be useful as electrolytes in the high performance double layer capacitor disclosed herein.

The electrolytic solutions evaluated for use with a 3 volt high performance double layer capacitor are identified in Table 3. The aluminum impregnated carbon fiber preforms and separator are preferably saturated with the described electrolytic solutions by means of a vacuum infiltration process.

TABLE 3

Non-Aqueous Electrolytes

| ID | Non-Aqueous Solvent | Electrolyte Salt | F/g C | Current (mA) | Capacitance (F) |
|---|---|---|---|---|---|
| 081094B | Acetonitrile | Tetraethyl-ammonium-Tetrafluoroborate 1.40M | 166.0 | 1000 | 14.72 |
| 062994A | Acetonitrile | Tetramethyl-ammonium-Tetrafluoroborate 0.095M | 103.1 | 100 | 10.26 |
| 032594A | Propylene Carbonate | Tetraethyl-ammonium-Tetrafluoroborate 0.982M | 103.3 | 100 | 12.46 |
| 032294A | 1,3-Dioxolane | Tetraethyl-ammonium-Tetrafluoroborate 0.122M | 13.7 | 10 | 1.67 |
| k32594A | $NH_3$ | NaI | 130.3 | 1000 | 15.79 |
| 032994A | $NH_3$ | $LiClO_4$ | 131.8 | 1000 | 16.45 |

From the foregoing, it should be appreciated that the present invention thus provides a double layer capacitor with aluminum/carbon composite electrodes and high performance electrolytes and a method of making the same. Further, it will be apparent that various changes may be made in the form, construction and arrangement of the parts thereof without departing from the spirit and scope of the invention or sacrificing all of its material advantages, the forms hereinbefore described being merely exemplary embodiments thereof.

To that end, it is not intended that the scope of the invention be limited to the specific embodiments and processes described. Rather, it is intended that the scope of this invention be determined by the appending claims and their equivalents.

What is claimed is:

1. An aluminum/carbon composite electrode comprising:

an activated carbon fiber preform;

a non-fibrous aluminum impregnant within said activated carbon fibers; and a conductive foil current collector pressed against a surface of said activated carbon fiber preform so as to be in contact with said aluminum impregnant.

2. The aluminum/carbon composite electrode of claim 1 wherein said carbon fiber preform is a carbon cloth preform.

3. The aluminum/carbon composite electrode of claim 1 wherein said carbon fiber preform is a carbon paper preform.

4. The aluminum/carbon composite electrode of claim 1 wherein said activated carbon fibers have a surface area in a range of about 500–3000 $m^2/g$.

5. The aluminum/carbon composite electrode of claim 1 wherein said activated carbon fibers have a surface area greater than 2000 $m^2/g$.

6. The aluminum/carbon composite electrode of claim 1 wherein said aluminum impregnant to carbon weight ratio is in a range of about 1.3 to 0.5.

7. The aluminum/carbon composite electrode of claim 1 wherein said aluminum impregnant to carbon weight ratio is less than 1.0.

8. The aluminum/carbon composite electrode of claim 7 wherein said aluminum/carbon composite electrode exhibits a resistivity of less than 1.5 $\Omega cm^2$.

9. The aluminum/carbon composite electrode of claim 1 wherein said conductive foil current collector comprises a layer of aluminum foil having a thickness in a range of about 0.5 mils to 3.0 mils.

10. An aluminum/carbon composite electrode comprising:

a carbon cloth preform fabricated from activated carbon fiber material;

aluminum impregnated into at least one side of the activated carbon fiber material so as to form a porous aluminum matrix therein, with the weight ratio of the aluminum to carbon comprising between about 1.3 to 0.5; and a current collector plate secured to the at least one side of the activated carbon fiber material wherein the aluminum is impregnated.

11. The aluminum/carbon composite electrode as set forth in claim 10 wherein the activated carbon fiber material is made from carbon fibers having a diameter of approximately 8–10 μm, and wherein the fiber material has a surface area of approximately 500 to 3000 $m^2/g$.

12. The aluminum/carbon composite electrode as set forth in claim 10 wherein the aluminum to carbon weight ratio is less than 1.0.

13. The aluminum/carbon composite electrode as set forth in claim 10 wherein the current collector plate comprises non-porous aluminum foil having a thickness of between about 0.5 mils and 3.0 mils.

\* \* \* \* \*